United States Patent [19]
Murphy et al.

[11] Patent Number: 5,084,171
[45] Date of Patent: Jan. 28, 1992

[54] OIL RECOVERY MOP

[75] Inventors: Michael P. Murphy, North Syracuse; Randal J. Stier, Central Square, both of N.Y.

[73] Assignee: Specialty Welding & Fabricating of New York Inc., Mattydale, N.Y.

[21] Appl. No.: 642,472

[22] Filed: Jan. 17, 1991

[51] Int. Cl.$^5$ .............................................. E02B 15/04
[52] U.S. Cl. ..................... 210/238; 210/242.4; 210/924; 15/209 R; 15/210 R; 15/228; 15/231
[58] Field of Search ............ 210/232, 238, 242.1, 210/242.4, 691, 776, 924, 122

[56] References Cited

U.S. PATENT DOCUMENTS

| | | | |
|---|---|---|---|
| 3,146,192 | 8/1962 | McClintock | 210/924 |
| 3,643,804 | 2/1972 | Sharpton | 210/242.4 |
| 3,667,608 | 6/1972 | Burroughs et al. | 210/242.4 |
| 3,668,118 | 6/1972 | Rhodes | 210/924 |
| 3,669,275 | 6/1972 | Downs | 210/242.4 |
| 3,739,913 | 6/1973 | Bogosian | 210/242.4 |
| 3,748,682 | 7/1973 | Rhodes | 210/924 |
| 3,881,211 | 5/1975 | Rhodes | 210/924 |
| 3,904,528 | 9/1975 | Yocum | 210/242.4 |
| 4,053,412 | 10/1977 | Stix | 210/242.1 |
| 4,362,539 | 12/1982 | Nelson et al. | 210/242.1 |
| 4,439,324 | 3/1984 | Crotti | 210/924 |
| 4,518,495 | 5/1985 | Harding | 210/242.1 |
| 4,822,487 | 4/1989 | Sorih | 210/238 |
| 4,919,820 | 4/1990 | Lafay et al. | 210/242.4 |
| 4,942,871 | 7/1990 | Kuhn | 15/228 |

Primary Examiner—Stanley S. Silverman
Assistant Examiner—Christopher Upton
Attorney, Agent, or Firm—Wall and Roehrig

[57] ABSTRACT

An oil recovery mop has a floating carriage, a handle, and a number of oil-absorbing pads or squares suspended from the carriage. The carriage has a pair of tubular pontoons that support a crossbar at a clearance over the surface of the water, and the pads are removably attached to spring clips on the crossbar. When the oil mop is pushed out, one side of each pad faces the surface to absorb spilled oil. When the oil mop is pulled in, the pads reverse themselves and the other side faces down to absorb oil.

8 Claims, 2 Drawing Sheets

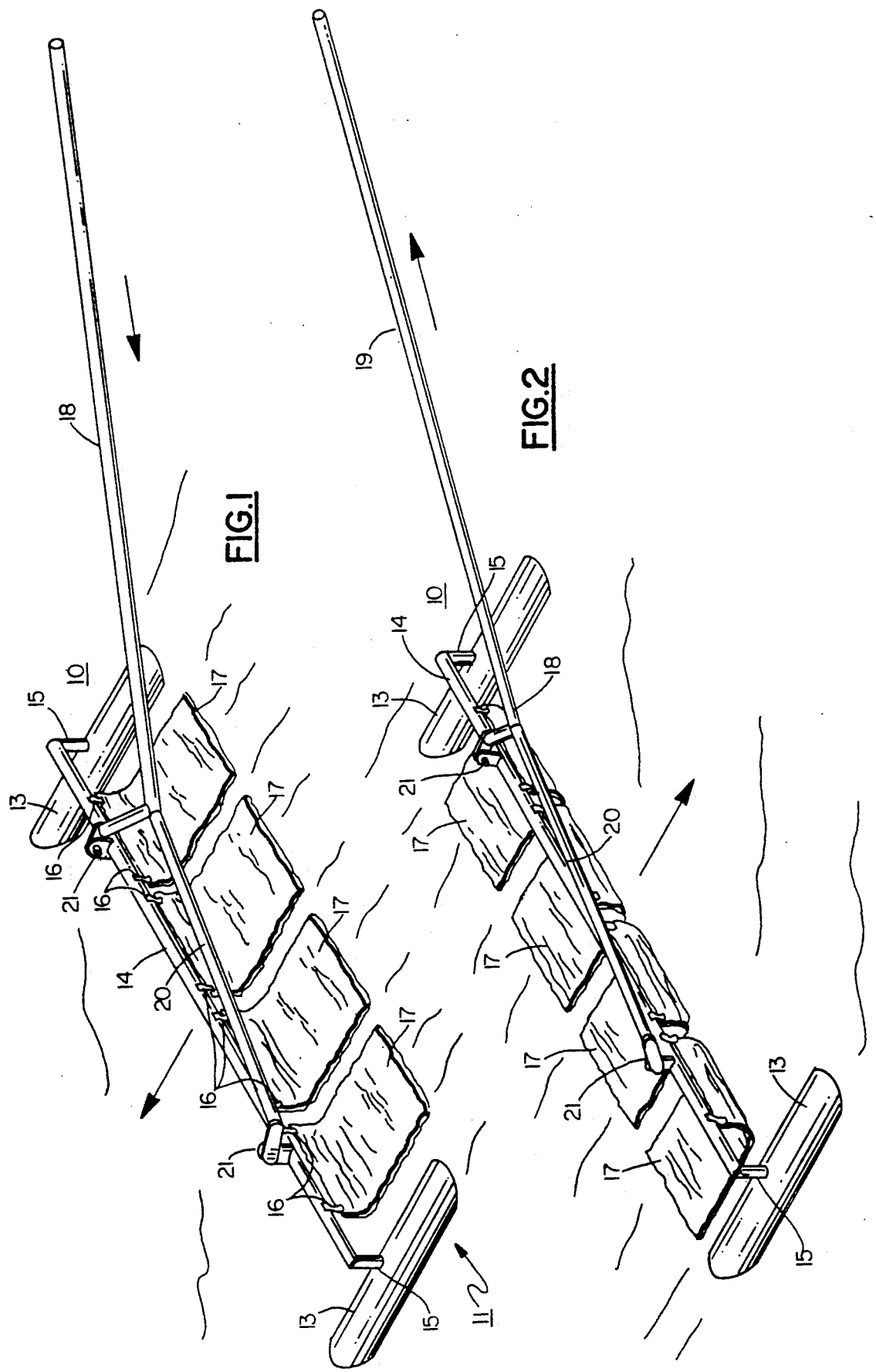

OIL RECOVERY MOP

BACKGROUND OF THE INVENTION

This invention is concerned with oil clean up and removal from bodies of water, and is more particularly concerned with an oil mop which permits efficient by-hand pickup of oil from a body of water, which can be an ocean, lake, stream, harbor, or the like.

Rapid clean up of spilled oil or other petroleum products requires simple, effective equipment which can be put into use quickly after an incident is discovered, which makes efficient use of its absorptive surfaces, and which can accommodate rapid turn around and disposal of the oil picked up by the equipment.

A number of oil pick up arrangements have been proposed which incorporate a fibrous oleophilic or petrophilic (oil absorbing) material to cleanse oil from the surface of water. Typical among these are the arrangements described in McClintock U.S. Pat. No. 3,146,192; Burroughs et al. U.S. Pat. No. 3,667,608; Rhodes U.S. Pat. No. 3,668,118; Downs U.S. Pat. No. 3,669,275; Bogosian U.S. Pat. No. 3,739,913: Yocum U.S Pat. No. 3,904,528; Crotti U.S. Pat. No. 4,439,324; Lafay et al. U.S. Pat. No. 4,919,820; and Rhodes U.S. Pat. No. 3,748,682. In these cases, a quantity of the oleophilic fibrous material which can be a batt, a filled mesh, an arrangement of parallel strips or yarns, or other form, is pulled or dragged across the water's surface. Oil is absorbed into this material, but the water remains behind. These arrangements are typically large booms or machines which cannot be quickly put into service, and cannot easily be worked by individual operators. Among these patents, the Rhodes Pat. No. 4,748,682 involves a hand mop with a handle and a head made of oil absorbing polypropylene strands. However, the mop construction, being substantially identical with a household floor mop, has only limited reach and limited capability for removing oil before it has to be wrung out or cleaned.

Thus, what has not previously been offered is a hand implement that can be worked by a single operator and which can cleanse oil from a relatively large area of a body of water; and which is easy to set up and clean.

OBJECTS AND SUMMARY OF THE INVENTION

Accordingly, it is an object of this invention to provide a hand implement for collecting oil that has spilled in a body of water.

It is another object to provide a floating device that is pushed and pulled by a handle and which carries at least one and preferably a plurality of oil absorbing cloths, pads, or bats that can be replaced easily with fresh ones.

In accordance with an aspect of the present invention an oil mop device has a floating carriage, one or more removable oil-absorbing cloth pads removably attached to a frame of the carriage, and a handle pivotally connected to the carriage. The frame is supported by a pair of elongated floats or pontoons and extends transversely between them with a clearance over the water's surface. There are pairs of clips or clamps to hold the oil-absorbing cloth pads. The clearance over the water's surface allows the pads to reverse themselves, that is, so that one side faces the water's surface when the carriage is being pushed and the other side when the carriage is being pulled. This ensures that oil is contacted onto both sides of each pad for optimal pickup. The floats, frame and handle can be of tubular aluminum so that the entire arrangement is light weight yet durable. The handle can be, for example, ten feet in length, and threaded handle extensions can extend it additional lengths. This permits solo operators to mop up relatively large areas of water surface as compared with previous hand operated oil mops.

The above and other objects, features, and advantages of this invention will become apparent from the ensuing description of a preferred embodiment, to be read in connection with the accompanying Drawing.

BRIEF DESCRIPTION OF THE DRAWING

FIGS. 1 and 2 are perspective views of the oil recovery mop device according to one embodiment of this invention.

DETAILED DESCRIPTION OF THE PREFERRED EMBODIMENT

Figure 3:
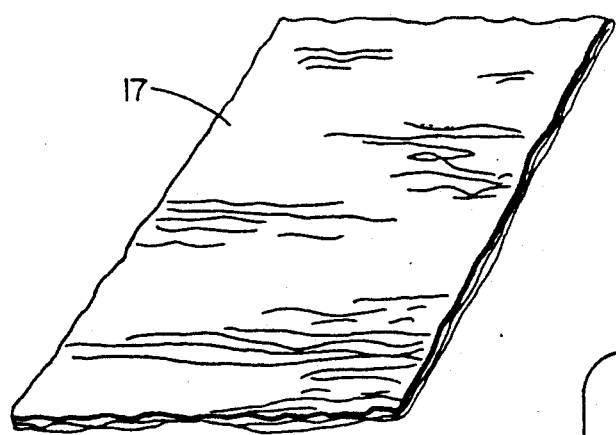
FIG. 3 shows an oil absorptive cloth pad.

With reference to the Drawing, FIG. 1 shows an embodiment of the oil mop 10, which has a floating carriage 11 formed of a transverse frame 12 supported above a pair of pontoons or floats 13. The frame 12 has a cross bar 14 whose ends are supported rigidly by short risers 15 that are affixed onto top center surfaces of the respective floats 13. The pontoons or floats 13 are tubular with ends cut at a 45 degree angle for reduced drag degree on the water. Here, the floats ar about two-and-one-half feet in length and five inches in diameter, and are separated by about six feet. There are four pairs of spring clips 16 of the quick release type spaced along the cross bar 14. Each pair of clips 16 holds a rectangle 17 of cloth, felt, or batt made of a pad of fibrous oil-absorbing (oleophilic) material such as melt-blown polypropylene fibers. Such pads are manufactured by SPC Sorbent Products Company, Inc. under the name SPC 100. The fibers should also be hydrophobic so that water is not absorbed into the rectangles 17.

A handle 18 has an elongated handle bar or rod 19 and a fork 20 that is pivotally connected, by respective quick-disconnect release stainless steel pivot pins, to a pair of ears 21 that are affixed to the bar 14 at spaced locations.

In FIG. 1, the handle 18 is being pushed out in the direction of the arrow, i.e., to the left in this view, so the carriage moves in this direction. The cloth rectangles 17 follow, and have one side facing down against the water surface to pick up oil from the water.

In FIG. 2, the handle is being pulled in, i.e. to the right in the drawing, and the carriage moves in that direction with the cloth rectangles 17 following. The clearance provided over the water surface below the bar 14 allows the cloth rectangles 17 to roll or flip over, so that when the direction of carriage travel reverses the other side of the rectangle 17 faces down and picks u oil from the surface of the water. To obtain the requisite clearance, the height of the carriage 11 is eight inches measured from the bottom of the floats 13 to the top of the risers 15.

As shown in FIG. 3, the cloth rectangles 17 have some thickness, and also absorb oil from their faces into the fibers of the rectangle. As the cloth rectangles become saturated with oil they can be removed from the spring clips 16 and replaced with fresh rectangles. The oil can be removed from the cloth by squeezing between rollers, or can be cleaned off with a solvent or a chemical agent, or by washing.

Figure 4:
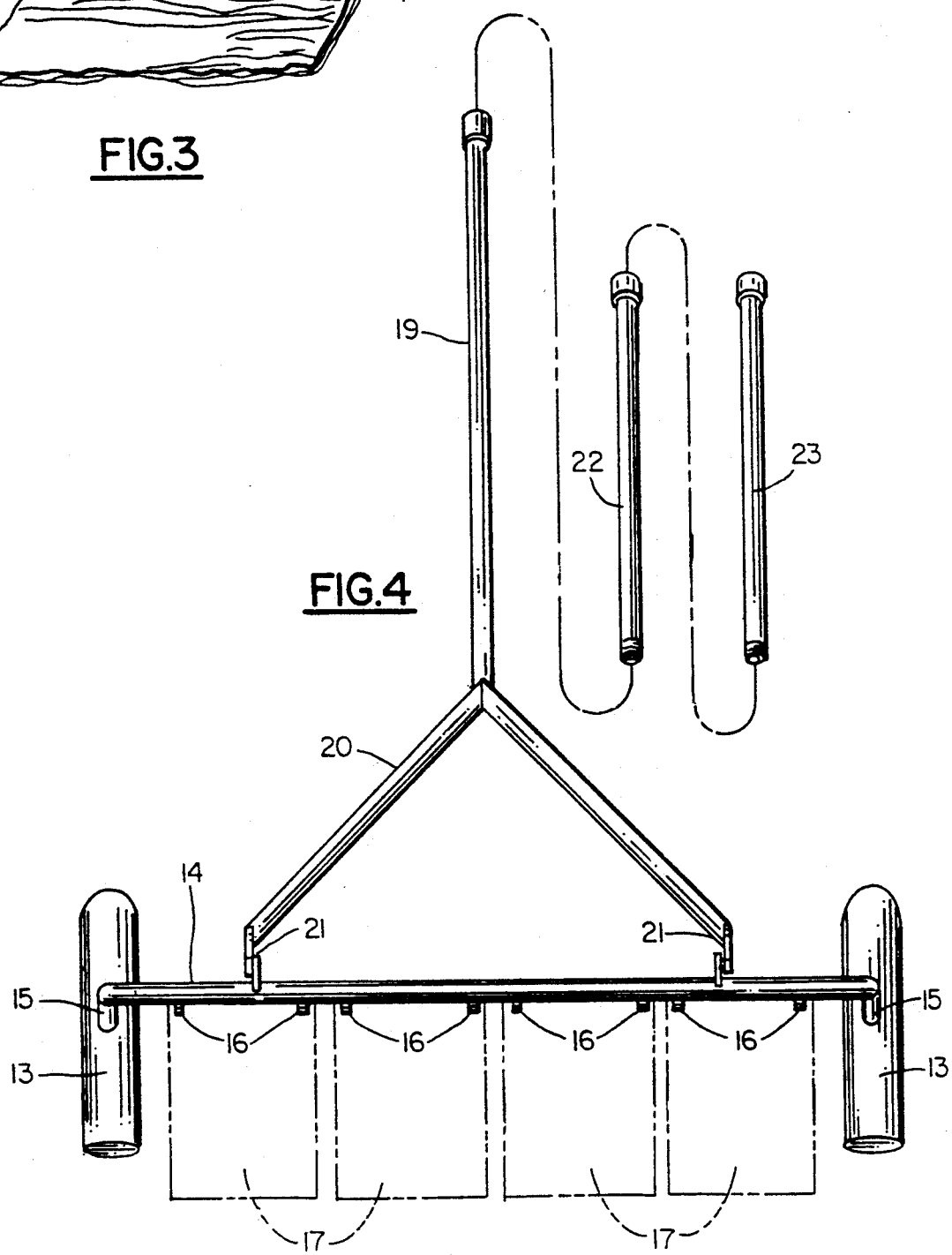
FIG. 4 is a front view of the oil recovery mop device, with handle extensions.

The handle 18 in this embodiment is about ten feet in length, and threaded handle extensions 22, 23, as is shown in FIG. 4, can be attached in sequence to its proximal end to extend the reach of the oil mop 10.

In other embodiments, more or fewer cloth pads can be carried on the floating carriage. Other handle arrangements can be employed, depending on the nature of the body of water to be cleaned. Also, the cloth pads need not be rectangular, although that shape is convenient in the described embodiment. The invention covers the carriage when used with an oil absorbent boom or share, or other medium. Moreover, the carriage and handle need not be tubular aluminum, but could be of another metal or of a plastic resin material, if desired.

While this invention has been described with reference to a preferred embodiment, it should be understood that the invention is not limited to that embodiment. Rather, many modifications and variations would present themselves to those skilled in the art without departing from the scope and spirit of this invention, as defined in the appended claims. This invention, as defined in the appended claims.

What is claimed is:

1. An oil recovery mop for removing oil from the surface of a body of water comprising at least one sheet of oil-absorbing medium formed of a oleophilic, hydrophobic fibrous material; a floating carriage which includes a transverse frame, a pair of spaced apart elongated floats, means for supporting the frame between the floats above the surface of said body of water, and clamping means on said frame between said floats and from which said at least one medium is releasably suspended; and a handle mounted on said carriage and which is pushed and pulled for propelling the carriage back and forth on said surface of said body of water, with said carriage and said medium being constructed and arranged such that said at least one medium has one side facing said surface when the carriage is being pulled and an opposite side facing the surface when the carriage is being pushed.

2. The oil recovery mop according to claim 1 wherein said frame includes a crossbar and said supporting means comprise support members at the ends of the crossbar affixed respectively onto upper sides of the two floats.

3. The oil recovery mop according to claim 2 wherein said clamping means includes respective pairs of spring clamps on said crossbar, each pair holding one of said at least one medium.

4. The oil recovery mop according to claim 1 wherein there are a plurality of said media releasably attached along said frame.

5. The oil recovery mop according to claim 1 wherein said handle is pivotally attached at two spaced locations along said frame.

6. The oil recovery mop according to claim 1 wherein said handle includes at least one threaded extension that can be removably attached onto a proximal end of the handle.

7. The oil recovery mop according to claim 1 wherein said floats are in the form of tubular pontoons.

8. The oil recovery mop according to claim 1 wherein each said oil absorbing medium is a rectangle of polypropylene fibers.

* * * * *